Nov. 12, 1929.  J. M. YOUNG  1,735,070
WINDSHIELD WIPER
Filed June 18, 1928
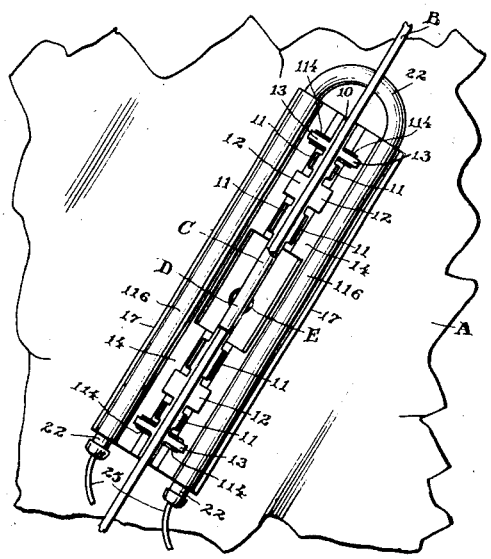
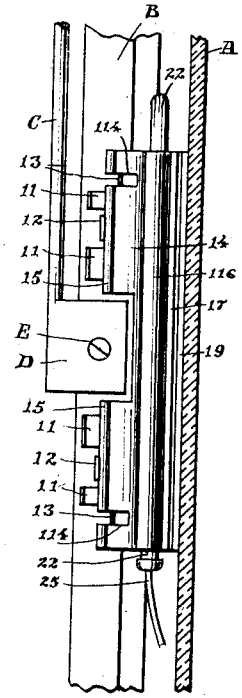
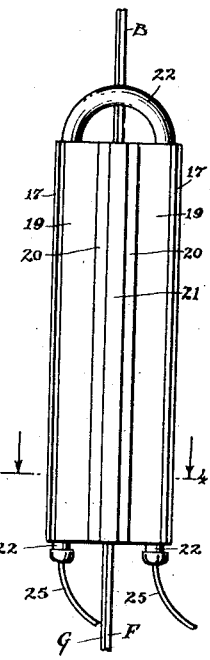
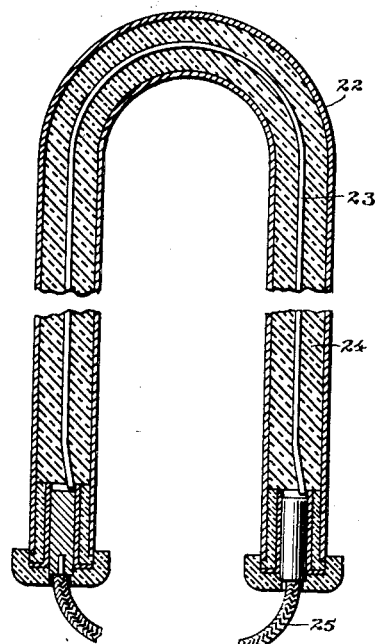
WITNESSES
INVENTOR
Joseph M. Young
BY
ATTORNEY Patented Nov. 12, 1929

1,735,070

UNITED STATES PATENT OFFICE

JOSEPH M. YOUNG, OF NEW YORK, N. Y.

WINDSHIELD WIPER

Application filed June 18, 1928. Serial No. 286,470.

My invention relates to windshield wipers of the type in which a swinging motion is imparted to the wiper to clear a sector shaped space on the windshield.

The general object of my invention is to provide an attachment for the wiper of the type referred to of a form to constitute a scraper to keep the windshield clear of ice and snow.

The nature of my invention and the distinguishing features in which the invention resides, as well as their advantages, will clearly appear as the description proceeds.

Reference is to be had to the accompanying drawings forming part of this specification, it being understood that the drawings are merely illustrative of examples of the invention.

Figure 1 is a front elevation of a scraper attachment for windshield wipers showing the same in operative position in association with a portion of a windshield and the well-known form of wiper, part of the usual wiper being broken away;

Figure 2 is a side elevation of the scraper attachment, the windshield being in vertical section;

Figure 3 is an inner side view of the attachment in position on the wiper;

Figure 4 is a cross section on an enlarged scale taken on the line 4—4 of Figure 3;

Figure 5 is a longitudinal section of a U-shaped heater unit forming part of the invention in its complete form;

Figure 6 is a plan view of a modified form of knife or cutter.

In the drawings the letter A indicates a portion of a windshield, B a known form of windshield wiper, C the operating rod for the wiper, said rod having a clip D secured by a screw E or equivalent as usual to the wiper strip B. The letter F indicates the felt element on the wiper strips B, and G indicates the rubber strip adjacent said felt strip F. The parts thus referred to by the letters A to G are well-known and form no part of my invention.

In accordance with my invention I provide an elongated clip 10 of general U-shape in cross section, as best seen in Figure 4, adapted to be slipped onto wiper strip B when the windshield is to be cleared of ice or snow. Said clip 10 has flaring edge members 11 for facility in placing the clip on the strip B. Also there are laterally disposed ears 12 on the opposite sides of the strip B on the edges to constitute stops for a scraper element 14, hereinafter described with its appurtenances.

In addition to the flaring edge members 11 and stop ears 12 retaining lugs 13 are provided on clip 10 which enter slots 114 formed in the cutter element 14. The cutter element 14 is mainly semi-circular in cross section and contacts at its beaded edge portions 15 with the sides of clip 10, as seen in Figure 4. Comparing the full line showing of element 14 in Figure 4 with the dotted lines in said figure the element 14 it will be readily understood is capable of being given a rocking movement while engaging its beaded edges 15 on the sides of the clip 10.

A knife supporting plate 16 is secured to the cutter element 14 and has longitudinally disposed and transversely curved portions 116, the edges 17 of said cutter supporting plate 16 being disposed laterally outward. A cutter plate 18 is held by a clamp plate 19 and screws 120 or equivalent fasteners against the rounded surface of the supporting element 16. Ranging lengthwise of clamp plate 20 at the face thereof is fastened in any suitable manner a strip 21 of rubber which contacts with the windshield A.

In Figure 6 instead of continuous cutting edges 19 the edge portions of the modified cutter element 118 are formed with longitudinal series of cutter sections 119, the cutter elements along one edge being in staggered relation to the like elements along the other edge.

With the described arrangement, to keep the windshield clear of snow and ice, the clip 10 is applied to the working edge of the usual wiper strip B, as in Figure 4. Then the auxiliary cutter element 14 is sprung onto clip 10 so that both clip 10 and element 14 will partake of the lateral vibrations imparted to the strip B by the usual operating rod C. It will be clear that since the rubber strip 21 has a frictional engagement with the windshield A, the strip 21 will adhere to said windshield, and, hence, the auxiliary element 14 will with its appurtenances rock from the full line position of Figure 4 to the dotted line position and backwards with the initial movement of the strip B in one direction or the other.

The knife edges 19 (or 119) are spaced from the edges 17 of the knife supporting plate 16 and said space is complementary to the space formed by the curved portion formed by the plate 16. Within the curved portion 116 is disposed a heating unit 22 of U-shape, as seen clearly in Figures 3 and 5.

The numeral 23 indicates the electric resistance element in the insulation 24. The numeral 25 indicates lead-in wires to the unit 22. Hence, snow or ice will be prevented by the heater unit from forming on the knife and adjacent parts.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. An attachment for windshield wipers for the purpose of clearing ice and snow from a windshield, said attachment including a clip adapted to be emplaced on the wiping strip of the windshield wiper, a knife-supporting element adapted to be sprung on to the said clip and having edge portions adapted to engage the sides of the clip, said supporting element being rockable transversely relative to the clip, cutting members on the said supporting element at opposite sides to alternately move over the windshield, and means held between the cutting members to contact with the windshield and cause the cutting members to be moved alternately from one side to the other.

2. An attachment for windshield wipers for the purpose of clearing ice and snow from a windshield, said attachment including cutter means, means to mount said cutter means on a wiper strip, and heater means adjacent the cutter means to melt the snow or ice cleared by the cutter means.

3. An attachment for windshield wipers for the purpose of clearing ice or snow from a windshield, said attachment including cutter means, means to removably mount said cutter means on a wiper strip, and heater means adjacent the cutter means to melt snow or ice cleared by the cutter means.

Signed at New York, in the county of New York and State of New York, this 15th day of June A. D. 1928.

JOSEPH M. YOUNG.